US006237924B1

(12) United States Patent
Reiland et al.

(10) Patent No.: US 6,237,924 B1
(45) Date of Patent: May 29, 2001

(54) SHOPPING CART WITH INTERNAL SEAT

(75) Inventors: Mary J. Reiland, Apple Valley; David Lehse, Oakdale, both of MN (US)

(73) Assignee: Four D Incorporated, Burnsville, MN (US)

( * ) Notice: Subject to any disclaimer, the term of this patent is extended or adjusted under 35 U.S.C. 154(b) by 0 days.

(21) Appl. No.: 09/122,872

(22) Filed: Jul. 27, 1998

Related U.S. Application Data

(60) Provisional application No. 60/053,961, filed on Jul. 28, 1997.

(51) Int. Cl.[7] .................................................. B62D 39/00
(52) U.S. Cl. ................................. 280/33.993; 280/47.35; 280/47.38; 280/79.2
(58) Field of Search ......................... 280/33.993, 33.992, 280/47.35, 47.38, DIG. 4, 47.4, 33.995, 79.2, 33.991; 297/256.17; 224/411, 407, 409

(56) References Cited

U.S. PATENT DOCUMENTS

| D. 280,858 | * | 10/1985 | Muellner et al. ............. D34/18 |
| D. 281,365 | * | 11/1985 | Gugler . |
| D. 318,550 | * | 7/1991 | Stefano . |
| D. 330,103 | * | 10/1992 | Andrews, Jr. et al. . |
| D. 356,414 | * | 3/1995 | Fridolph . |
| D. 357,105 | * | 4/1995 | Reiland et al. . |
| 2,420,088 | * | 5/1947 | Milburn . |
| 2,443,236 | * | 6/1948 | Gallagher .................. 280/33.993 |
| 2,997,311 | * | 8/1961 | Umanoff . |
| 3,044,801 | * | 7/1962 | Vicany . |
| 3,497,234 | * | 2/1970 | Schray .................. 280/33.993 |
| 3,575,250 | * | 4/1971 | Dykes . |
| 3,834,726 | * | 9/1974 | Hobza . |
| 3,953,046 | * | 4/1976 | Johansson . |
| 4,116,456 | * | 9/1978 | Stover et al. .............. 280/33.993 |
| 4,305,601 | | 12/1981 | Berge .................. 280/304.1 |
| 4,381,870 | * | 5/1983 | Muellner .................. 280/33.993 |
| 4,423,882 | * | 1/1984 | Stover et al. .............. 280/33.993 |
| 4,484,755 | | 11/1984 | Houston .................. 280/33.992 |
| 4,537,413 | * | 8/1985 | Rehrig .................. 280/33.993 |
| 4,560,180 | * | 12/1985 | Ulmer .................. 280/33.993 |
| 4,610,454 | * | 9/1986 | Gill . |
| 4,650,199 | * | 3/1987 | Rehrig . |
| 4,771,840 | * | 9/1988 | Keller . |
| 4,875,695 | * | 10/1989 | Badger et al. .......... 280/33.993 |
| 5,011,169 | * | 4/1991 | Henderson et al. . |
| 5,074,570 | * | 12/1991 | Ferris et al. ............ 280/33.995 |

(List continued on next page.)

FOREIGN PATENT DOCUMENTS

| 4202428 | * | 8/1992 | (DE) . |
| 4219121 | * | 12/1993 | (DE) . |
| 4317228 | * | 12/1993 | (DE) . |
| 2 025 860 | * | 3/1979 | (GB) . |
| 2218382 | * | 11/1989 | (GB) .............. 280/33.993 |

OTHER PUBLICATIONS

Consumer Product Safety Alert. From the U.S. Consumer Product Safety Commission, Washington, D.C. 20202. Mar. 1990. Falls from Shopping Carts Cause Head Injuries.*

*Primary Examiner*—Lanna Mai
*Assistant Examiner*—Ruth Ilan
(74) *Attorney, Agent, or Firm*—Faegre & Benson LLP

(57) ABSTRACT

A shopping cart having a base frame supported by at least one front wheel and a pair of rear wheels. At least one basket is supported on the base frame. The basket has a plurality of side walls defining a basket perimeter and a bottom wall located at a height above the base frame. A protected location is positioned substantially within the basket perimeter. An entrance through the basket perimeter provides ingress and egress to the protected location. A platform is provided proximate the protected location and the entrance (s). A seat is located within the protected location at about the height of the bottom wall.

17 Claims, 5 Drawing Sheets

U.S. PATENT DOCUMENTS

| | | | |
|---|---|---|---|
| 5,076,599 | * 12/1991 | Lockett et al. . | |
| 5,149,114 | 9/1992 | Lewandowski et al. . | |
| 5,176,395 | 1/1993 | Garforth-Bles . | |
| 5,180,181 | * 1/1993 | Letechipia | 224/407 |
| 5,188,389 | 2/1993 | Baechler et al. . | |
| 5,203,578 | 4/1993 | Davidson et al. . | |
| 5,263,726 | * 11/1993 | Wood | 280/33.992 |
| 5,312,122 | 5/1994 | Doty . | |
| 5,544,904 | * 8/1996 | Maher | 280/47.35 |
| 5,641,200 | 6/1997 | Howell . | |
| 5,702,114 | * 12/1997 | Downing et al. | 280/33.993 X |
| 5,823,548 | 10/1998 | Reiland et al. | 280/33.993 |
| 5,882,021 | 3/1999 | Reiland et al. | 280/33.993 |
| 5,961,133 | * 10/1999 | Perry | 280/33.993 |
| 6,022,031 | 2/2000 | Reiland et al. | 280/33.993 |

\* cited by examiner

SHOPPING CART WITH INTERNAL SEAT

The present application claims the benefit of prior filed provisional application No. 60/053,961 entitled Shopping Cart with a Seat Located within the Basket Perimeter, filed Jul. 28, 1997.

FIELD OF THE INVENTION

The present invention relates to a shopping cart with a user accessible seat located within a basket perimeter.

BACKGROUND OF THE INVENTION

Shopping carts found in retail establishments generally include a child seat that is part of the rear panel of the shopping cart basket. A back support panel is attached to the rear panel, usually on the inside of the basket, thereby reducing the carrying capacity of the shopping cart. A fold down seat portion traverses the back support panel and the rear panel to form the child set proximate the upper portion of the rear panel. Generally, the seat is arranged so that the child's legs extend through openings in the back panel. Airport luggage carts have a similar seat arrangement. However, luggage carts weigh less than a shopping cart and are therefore more prone to tip over.

The seats on shopping or luggage carts only have room for one child. Also, once a child reaches approximately 35 pounds, or is more than approximately 54" tall, the seat on these carts starts to be too small and uncomfortable for the child. Additionally, children older than approximately 3 years find these seats confining and often attempt to climb out. One approach is to provide a safety strap to retain the child in the cart seat. However, this approach does not address larger children who do not fit properly into the cart seat or parents that have more than one small child. Consequently, it is very common to see children riding in the basket portion of the shopping cart or standing on the front edge of the lower frame while gripping onto the basket portion, or standing on the luggage portion of a luggage cart. Moreover, conventional child seats on shopping carts are not appropriate for adults.

Allowing a child to ride in the basket portion of the shopping cart has proven to be extremely dangerous. The U.S. Consumer Product Safety Commission reported 12,000 hospital emergency room head injuries in 1988 along, to children under 5 years of age primarily due to children falling from shopping carts. Approximately one third of these head injuries were concussions, fractures or internal injuries. (See Consumer Product Safety Alert from the U.S. Consumer Product Safety Commission, March 1990, which is hereby incorporated by reference.) In 1992, the U.S. Consumer Product Safety Commission estimates that 22,920 children were treated in hospital emergency rooms for injuries related to shopping carts.

While old style shopping carts were constructed of metal, newer carts are utilizing more plastic parts, including plastic basket portions. Consequently, newer shopping carts weigh much less than the old style metal carts. Since the seat is generally on the upper portion of the rear panel of the basket portion, a larger child can significantly raise the center of gravity of the cart, especially when the cart is empty. Since it is common for parents to place a child weighing 30 pounds or more in the seat, the risk of tipping over the cart is substantial. The reported accidents also include injuries resulting from children tipping over the cart by rocking back and forth.

Another source of injury to children riding in shopping carts is other shoppers. The child's legs typically hang out of the seat at the rear of a conventional shopping cart. Arms and hands are often hanging over the edge of the basket. It is not uncommon for a child's limbs to be pinched between a portion of the shopping cart in which she is riding and another shopping cart or a stationary object.

U.S. Pat. Nos. 3,044,801 (Vicany) and 4,771,840 (Keller) disclose propelled shopping carts where the user rides external to the basket. U.S. Pat. Nos. Des. 318,550 (Stefano), 3,497,234 (Schray) and 5,312,122 (Doty) disclose a child carrier located external to the basket portion of the shopping cart. U.S. Pat. No. 2,420,088 discloses a child's cart with a box or trunk mounted at the front.

U.S. patent application Ser. No. 08/732,963, filed Oct. 30, 1996 and U.S. Pat. No. Des. 357,105 disclose a child carrier accessory attachable to a shopping cart with a seat having a low center of gravity.

BRIEF SUMMARY OF THE INVENTION

The present invention relates to a shopping cart with a seat located within a basket perimeter. Although the seat is primarily intended for children, it may be used for carrying adults.

The shopping cart has a base frame supported by at least one front wheel and a pair of rear wheels. At least one basket is supported on the base frame. The basket has a plurality of side walls defining a basket perimeter and a bottom wall located at a height above the base frame. A protected location is positioned substantially within the basket perimeter. An entrance through the basket perimeter provides ingress and egress to the protected location. A platform is provided proximate the protected location and the entrance(s). A seat is located within the protected location at about the height of the bottom wall.

Since the platform is relatively low to the ground, a child can get off and on the shopping cart without assistance and with minimal risk of injury. Locating a child on the seat of the present invention, rather than the child seat on conventional shopping carts, results in a lower center of gravity. Moreover, the child is protected by the basket(s) of the shopping cart. The child's limbs do not hang out of the baskets, such as on conventional shopping carts. In one embodiment, doors can optionally be provided for one or both of the entrances.

In one embodiment, additional side walls define a portion of the protected location. The protect location is preferably separate from the carrying location of the basket. In another embodiment, the basket comprises a front basket and a rear basket separated by a gap. Opposing side walls of the front and rear baskets define the protected location. In another embodiment, the basket defines a generally horse-shoe shape. The basket preferably has a rear wall pivotally attached to the shopping cart for nesting with a front portion of a second shopping cart. The basket may be constructed from plastic (such as a fiber reinforced thermoplastic), fiberglass or metal.

The entrance is preferably an imaginary plane defining a portion of the outer perimeter. The entrance may be located along the front, rear or sides of the shopping cart. A gate may optionally be provided for releasably extending across the entrance to the protected location. Safety strap can be provided for retaining a user to the seat.

DETAILED DESCRIPTION OF THE INVENTION

Figure 1:
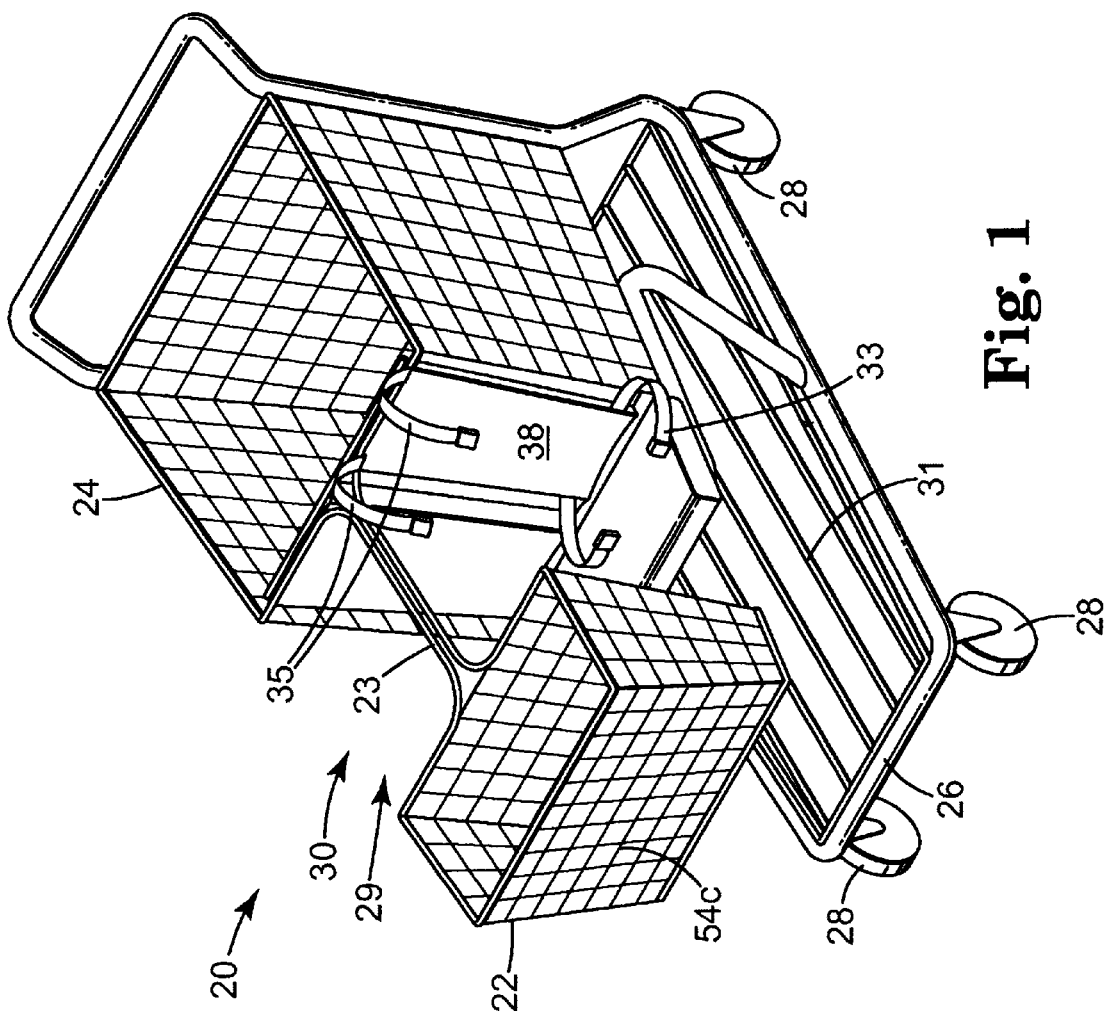
FIG. 1 is a perspective view of a shopping cart with an internal seat in accordance with the present invention.
Figure 2:
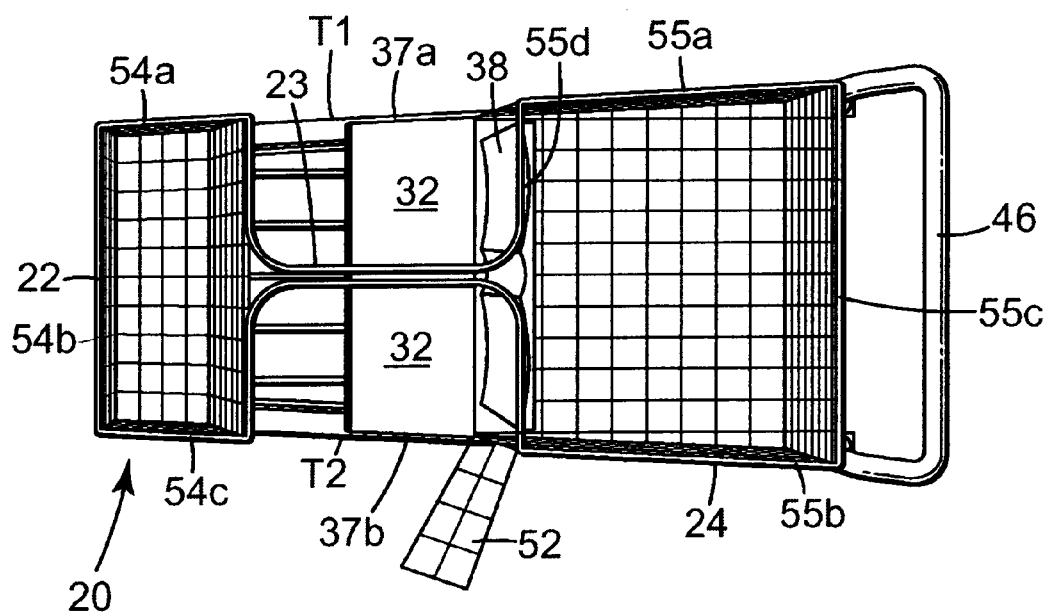
FIG. 2 is a top view of the shopping cart of FIG. 1.
Figure 3:
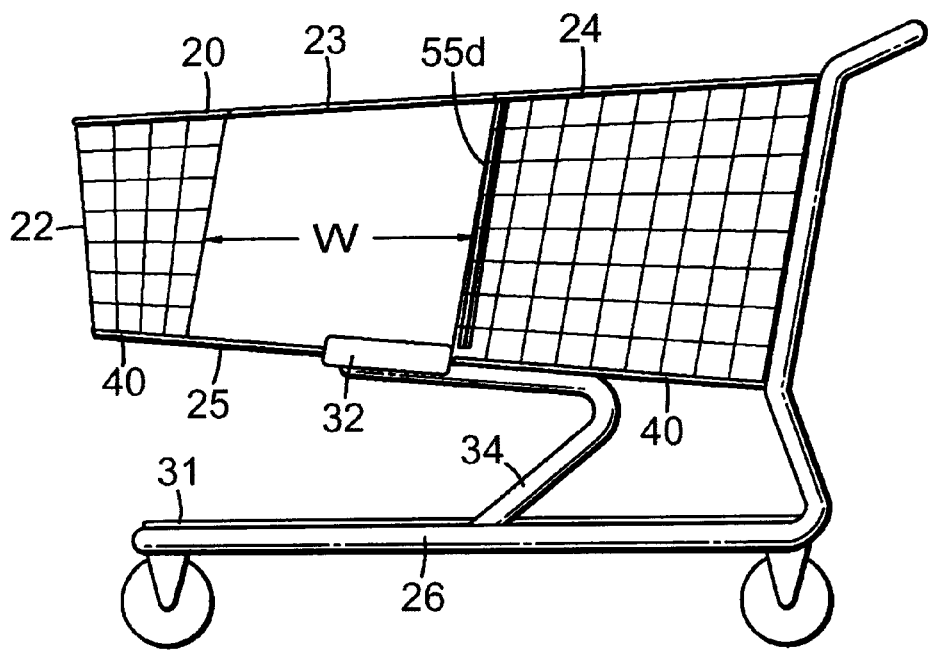
FIG. 3 is a side view of the shopping cart of FIG. 1.

FIGS. 1 through 3 illustrate an exemplary shopping cart 20 including a front basket 22 and a rear basket 24 supported by a base frame 26 having wheels 28. The front basket 22 is attached to the rear basket 24 by an upper support member 23 and a lower support member 25. In an alternate embodiment, a support member can be provided between the base frame 26 and the front basket 22.

Gap 29 maintained by the support members 23, 25 between the front and rear baskets 22, 24 defines a protected location 30 within a basket perimeter 53 (see FIG. 2). The basket perimeter 53 is defined by side walls 54a, 54b, 54c of the front basket 22, side walls 55a, 55b, 55c of the rear basket 24 and imaginary planes T1 and T2 connecting side walls 54a to 55a, and 54b to 55b, respectively. The protected location 30 is entirely within the basket perimeter 53 and is accessible through one of the entrances 37a, 37b. Basket perimeter refers to the greatest cross-sectional area defined by the basket side walls and at least one imaginary plane extending across an entrance to the protected location. The basket perimeter 53 does not include the top or bottom of the baskets 22, 24.

A user accessible seat 32 is supported by a frame member 34 near side wall 55d of the rear basket 24. User accessible refers to ingress and egress to the seat through the basket perimeter, rather than through the top of the basket, such as on conventional shopping carts. Typically, a child can get on and off the seat 32 without assistance. The seat 32 is located in a protected location 30 internal to the basket perimeter 53. The seat 32 is preferably located less than about 20 inches, and more preferably less than about 18 inches and most preferably less than about 16 inches above the base frame 26. In the illustrated embodiment, the seat 32 is located at about the height of bottom wall 40 of the baskets 22, 24.

A back support 38 is located on outer surface of the side wall 55d. Platform 31 is located on the base frame 26 beneath the seat 32 such that the child can step into and out of the protected location 30 without assistance. The platform 31 typically extends across the entire support frame 26. The seat 32 typically can accommodate two children simultaneously. In an alternate embodiment, the seat 32 may be attached to the front basket 22 so that the child faces the rear of the shopping cart 20.

The seat 32 preferably has a safety mechanism for securing each child to the shopping cart 20. The preferred safety mechanism includes a waist strap 33 and a shoulder strap 35. Although not recommended by the manufacturer, the child can alternatively stand on the platform 31 while gripping the front basket 22.

Locating the seat 32 within the perimeter 53 of the shopping cart 20 serves several functions. Since the platform 31 is relatively low to the ground, the child can typically get off and on the shopping cart 20 without assistance and with minimal risk of injury. Locating a child on the seat 32, rather than the child seat on conventional shopping carts, results in a lower center of gravity for the cart 20. Moreover, the child is protected by the baskets 22, 24 of the shopping cart 20. The child's legs do not hang out of the baskets, such as on conventional shopping carts. In one embodiment, doors 52 can optionally be provided for one or both of the entrances 37a, 37b (see FIG. 2).

Figure 4:
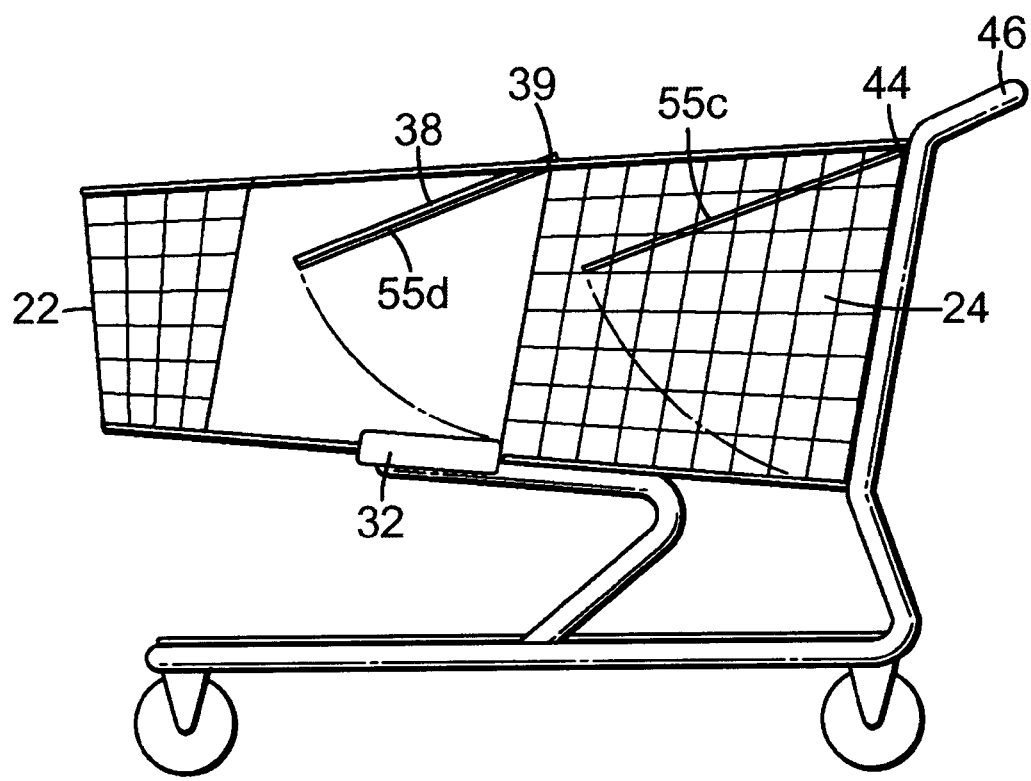
FIG. 4 is a side view of the shopping cart of FIG. 1 configured for nesting with additional shopping carts.

As illustrated in FIG. 4, the rear side wall 55c of the rear basket 24 is pivotally attached at an axis 44 near handle 46, as is known in the shopping cart arts. Rear side wall 55c can rotate upward around the axis 44 (clockwise in FIG. 4) to facilitate nesting of a front basket 22 of another cart 20 with the rear basket 24. The front basket 22 is preferably slightly smaller than the rear basket 24. In the illustrated embodiment, the side walls 54a, 55a and 54b, 55b are tapered toward the side wall 54c. Optionally, the side wall 55d and back support 38 may pivot clockwise about the axis 39 to further facilitate nesting of the shopping carts 20.

Figure 5:
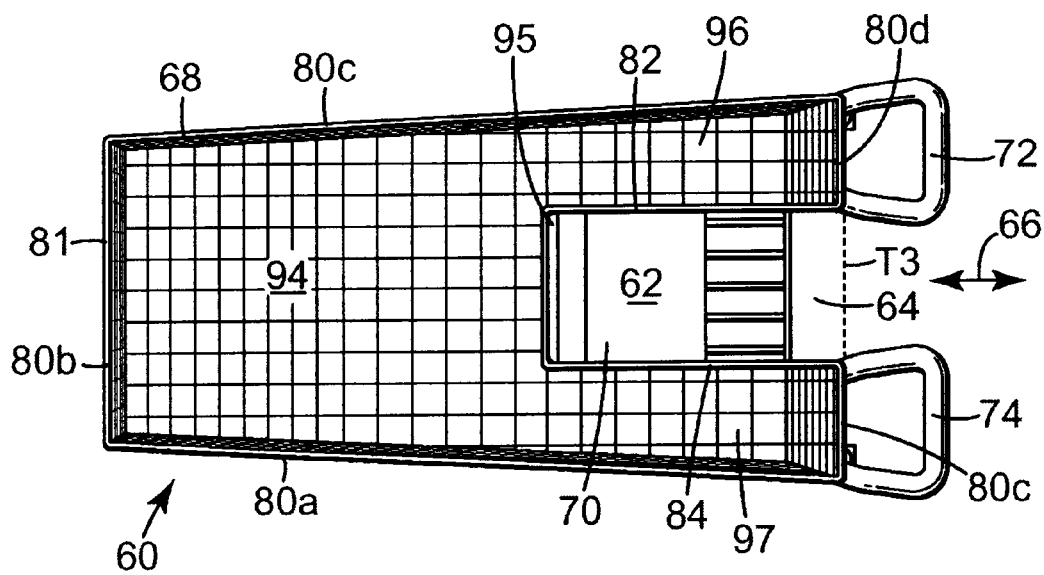
FIG. 5 is a top view of an alternate shopping cart in accordance with the present invention.
Figure 6:
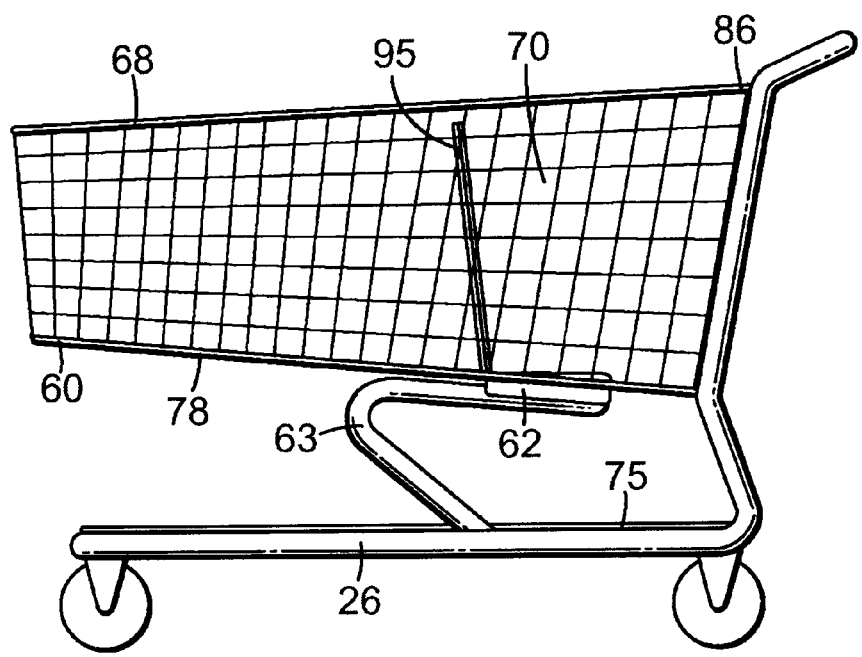
FIG. 6 is a side view of the shopping cart of FIG. 5.

FIGS. 5 and 6 illustrate an alternate shopping cart 60 having an internal seat 62 accessible through a rear entrance 64 along an axis 66. The seat 62 is supported by a frame member 63 attached to the base frame 26. As best seen in FIG. 5, basket 68 has a horse-shoe shape that forms the protected location 70. The protected location 70 is contained within basket perimeter 81 defined by side walls 80a, 80b, 80c, 80d, 80e and an imaginary plane T3 connecting side walls 80d to 80e. The rear entrance 64 is typically protected by a parent when pushing the shopping cart 60. A gate (not shown) may optionally be provided to close off the rear entrance 64. In the embodiment of FIGS. 5 and 6, the child typically faces the rear of the shopping cart 60.

Handles 72, 74 are located on either side of the entrance 64 to permit easy access to the seat 62 by the child. Alternatively, a folding handle (not shown) may be pivotally attached to the handle 74 for releasably attachment to the handle 72 across the rear entrance 64. The base frame 26 includes a platform portion 75 proximate the seat 62 so that the child may get on and off the cart 60 without assistance. The seat 62 is preferably located at about the height of bottom wall 78 of the basket 68, as discussed above.

Inner side walls 82, 84, back support 95, and the outer side walls 80a, 80b, 80c, 80d, 80e define a carrying region 94 of the basket 68. The carrying region 94 is preferably separate from the protected location 70. The carrying region 94 includes smaller side regions 96, 97 on either side of the protected location 70. In one embodiment, the rear side walls 80d, 80e and portions of the inner side walls 82, 84 are pivotally attached at about an axis 86 near handles 72, 74 to facilitate nesting with a leading edge of another shopping cart 60.

In an alternate embodiment, the seat 62 can be the full width of the cart 60, such that the inner side walls 82, 84, the side walls 80d, 80e, and the side regions 96, 97 are eliminated. The handles 72, 74 would be attached to the side walls 80c, 80a, respectively. Although the size of the carrying location 94 would be reduced relative to the embodiment of FIGS. 5 and 6, this alternate embodiment permits two children or an adult to be located on the seat 62. The portions of the side walls 80a, 80c adjacent to the protected location 70 define a portion of the basket perimeter 81.

Figure 7:
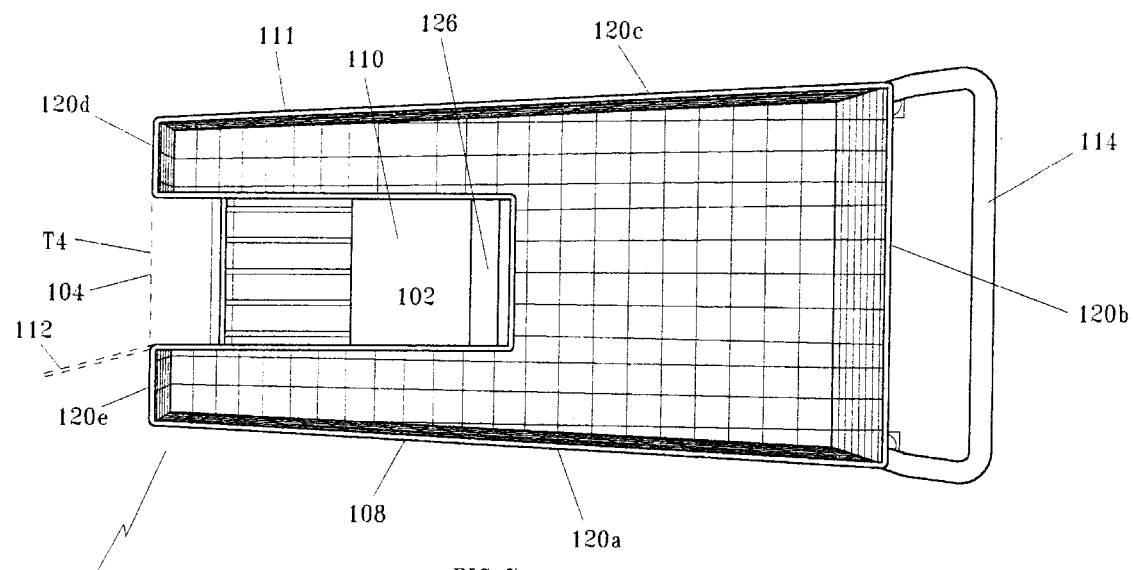
FIG. 7 is a top view of a second alternate shopping cart in accordance with the present invention.
Figure 8:
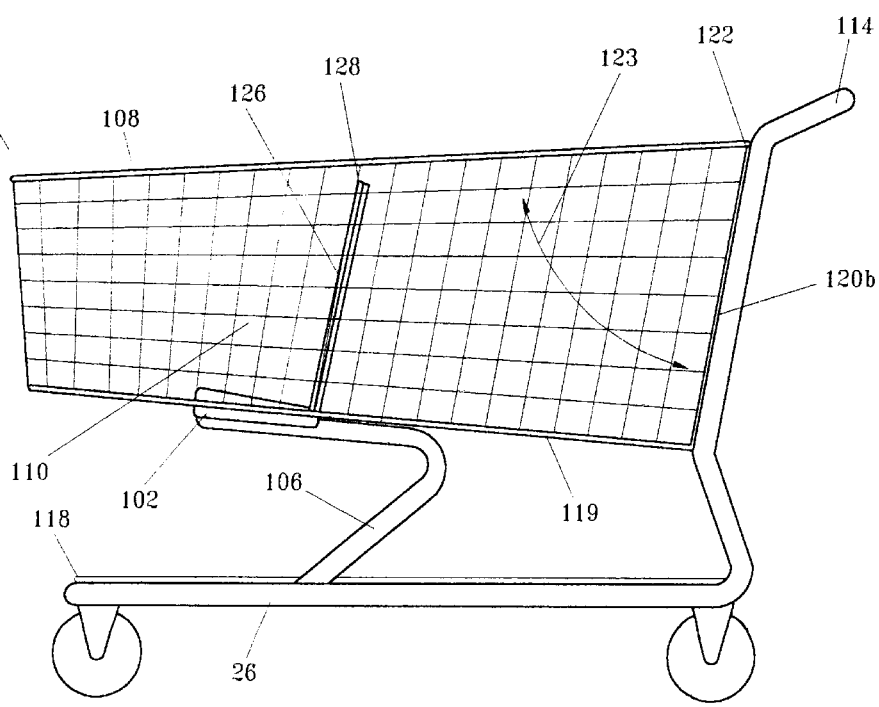
FIG. 8 is a side view of the shopping cart of FIG. 7.

FIGS. 7 and 8 illustrate an alternate shopping cart 100 having an internal seat 102 accessible through a front entrance 104. The seat 102 is support by a frame member 106 attached to the base frame 26. As best seen in FIG. 7, basket 108 has a horse-shoe shape that forms a protected location 110. The protected location 110 is contained within a basket perimeter 111 defined by side walls 120a, 120b, 120c, 120d, 120e and an imaginary plane T4 connecting side walls 120d to 120e. A pivoting gate 112 may optionally be provided. In the embodiment of FIGS. 7 and 8, the child typically faces the front of the shopping cart 100.

A handles 114 is located at the rear 116 of the cart 100. The base frame 26 includes a platform portion 118 proximate the seat 102. The seat 102 is preferably located at about the height of bottom wall 119 of the basket 108. Rear side wall 120b is pivotally attached at axis 122 near the handle 114. The rear wall 120b pivots upward (clockwise in FIG. 7) in a direction 123 about the axis 122 to facilitate nesting with a leading edge of another shopping cart 100. Optionally, back support 126 may pivot about an axis 128 to further facilitate nesting of the carts 100.

Since the seat(s) of the present invention is lower to the ground than conventional shopping carts, the center of gravity of the present shopping cart when a passenger is being carried is lower than conventional shopping carts. Consequently, the baskets 22, 24, 68, 108 may be constructed from light-weight materials, such as plastic or fiberglass. The base frame 26 is typically constructed of metal, although other materials may be used.

All patents and patent applications disclosed herein, including those set forth in the Background of the Invention, are hereby incorporated by reference. It will be understood that these exemplary embodiments in no way limit the scope of the invention. Other modifications of the invention will be apparent to those skilled in the art in view of the foregoing description. These descriptions are intended to provide specific examples of embodiments which clearly disclose the present invention. Accordingly, the invention is not limited to the described embodiments or to the use of specific elements, dimensions, materials or configurations contained therein. All alternative modifications and variations of the present invention which fall within the spirit and broad scope of the appended claims are covered.

What is claimed:

1. A shopping cart apparatus with an internal seat comprising:
    a cart having a frame supported by a plurality of wheels;
    a front basket attached to a rear basket in a cantilever configuration, the front basket being horizontally separated from the rear basket by a gap comprising a protected location;
    an entrance providing ingress and egress to the protected location; and
    a seat located within the protected location.

2. A shopping cart apparatus with an internal seat comprising:
    a cart having a frame supported by a plurality of wheels;
    a front basket attached to a rear basket in a cantilever configuration, the front basket being horizontally separated from the rear basket by a gap comprising a protected location;
    an entrance that permits a child unassisted ingress and egress to the protected location; and
    a seat located within the protected location.

3. A manual shopping cart apparatus with an internal, user accessible seat, comprising:
    a cart having a base frame supported by a plurality of wheels;
    a protected location surrounded on at least two sides by one or more baskets supported on the base frame;
    the one or more baskets having a plurality of side walls, at least some of the plurality of sides walls and at least one imaginary plane parallel to a side wall and extending between two of the side walls comprising a basket perimeter that comprises the greatest cross-sectional area of the one or more baskets, wherein the protected location and the base frame are located substantially within the basket perimeter, the at least one imaginary plane comprising an entrance providing ingress and egress to the protected location substantially within the basket perimeter;
    the one or more baskets further comprising a bottom wall located at a height above the base frame; and
    a seat located within the protected location.

4. The apparatus of claim 3 wherein the basket perimeter comprises a generally horse-shoe shape.

5. The apparatus of claim 3 comprising a platform proximate at least a portion of the entrance and a portion of the protected location.

6. The apparatus of claim 3 wherein the at least one basket comprises a front basket and a rear basket supported on the base frame and horizontally separated by a gap, the protected location being located within the gap.

7. The apparatus of claim 3 wherein the at least one basket comprises a front basket attached to a rear basket in a cantilever configuration, the front basket being horizontally separated from the rear basket by a gap comprising the protected location.

8. The apparatus of claim 3, wherein the base frame includes a platform that permits a child unassisted ingress and egress to the protected location.

9. The apparatus of claim 3, wherein the entrance is located at one of a front portion, a rear portion or a side portion of the basket perimeter.

10. The apparatus of claim 3, further comprising a gate releasably extending across the entrance to the protected location.

11. The apparatus of claim 3 wherein the seat comprises a length equal to a width of the basket.

12. The apparatus of claim 3 further comprising a safety straps for retaining a user to the seat.

13. The apparatus of claim 3 wherein the basket comprises at least one rear wall pivotally attached to the shopping cart for nesting with a front portion of a second shopping cart.

14. The apparatus of claim 3 wherein the basket comprises plastic.

15. The apparatus of claim 3 wherein the platform extends across substantially all of the base frame.

16. The apparatus of claim 3 wherein the at least one imaginary plane is coplanar with at least one side wall.

17. The apparatus of claim 3 wherein the at least one imaginary plane comprises two imaginary planes that are each coplanar with a side wall.

* * * * *